United States Patent [19]

Linkner, Jr.

[11] Patent Number: 5,364,067
[45] Date of Patent: Nov. 15, 1994

[54] VEHICULAR ANTI-LOCK BRAKE SYSTEM HYDRAULIC CONTROL VALVE AND METHOD OF MAKING SAME

[75] Inventor: Herbert L. Linkner, Jr., Dexter, Mich.

[73] Assignee: Kelsey-Hayes Corporation, Romulus, Mich.

[21] Appl. No.: 198,518

[22] Filed: Feb. 18, 1994

[51] Int. Cl.⁵ ............................................. F16K 31/06
[52] U.S. Cl. ............................. 251/129.02; 251/129.15; 137/454.2; 29/890.13
[58] Field of Search ........................ 251/129.02, 129.15; 29/890.13; 137/454.2

[56] References Cited

U.S. PATENT DOCUMENTS

| | | |
|---|---|---|
| 3,462,116 | 8/1969 | Wright, Jr. ................ 29/890.13 X |
| 4,790,351 | 12/1988 | Kervagoret ............... 251/129.02 X |
| 4,828,335 | 5/1989 | Fuller et al. . |
| 5,102,096 | 4/1992 | Siegel et al. . |
| 5,145,149 | 9/1992 | Moehle . |
| 5,167,442 | 12/1992 | Alaze et al. . |
| 5,267,785 | 12/1993 | Maisch . |

Primary Examiner—Arnold Rosenthal
Attorney, Agent, or Firm—Brooks & Kushman

[57] ABSTRACT

A vehicle anti-lock brake system control unit having a control valve for a housing with a control valve bore therein. The control valve includes a sleeve with a moveable armature, and a coil surrounding the sleeve for moving the armature from a normally open valve position to a normally closed valve position. The control valve also includes a valve body having an outer end attached to the sleeve and an inner end seated within the control valve bore of the housing. A pole piece concentrically located within the valve body defines the flow passage through the valve and is fixed to the valve body by a swaged joint, thereby eliminating a threaded joint. The control valve is likewise held to or within the control unit by a non-threaded connection thereby eliminating altogether threaded connections in the control unit.

13 Claims, 4 Drawing Sheets

VEHICULAR ANTI-LOCK BRAKE SYSTEM HYDRAULIC CONTROL VALVE AND METHOD OF MAKING SAME

TECHNICAL FIELD

This invention relates to anti-lock brake system hydraulic control valves, particularly for vehicular applications, and more particularly concerning the design and method of manufacturing solenoid actuated valve units.

BACKGROUND ART

Many of the automobiles being produced today are equipped with a hydraulic brake system including an anti-lock brake subsystem for assuring that the vehicle wheels do not lock up during sudden applications of the brake. The anti-lock brake system (ABS) is considered by many to be the most significant improvement in vehicle safety within the last decade and it is presently being offered as standard equipment in many vehicles.

Most types of ABS include a singular hydraulic control unit, usually in the form of an aluminum block, in which there is incorporated all of the componentry necessary to provide the anti-lock braking function to the braking system. This includes solenoid actuated isolation valves for isolating a particular wheel brake from braking force exerted through the brake pedal and master cylinder. It also includes solenoid actuated hold-/dump valves which are opened to relieve braking pressure at each of the wheel brakes thereby allowing the brake to relax its hold on the wheel. It further includes several low pressure accumulators and a pump for providing supplemental brake pressure to the wheels during the period of controlled braking.

All of this componentry is located in a single control unit, which is typically an aluminum block bored as required to receive the components and to provide fluid communication between the valves, accumulators, and pump to complete the hydraulic circuitry. Consequently, the control unit can be of considerable size and complexity from a manufacturing viewpoint, in that a considerable number of machining operations are required. Amongst these machining requirements, is that of threading each of the bores which are to receive a control valve. Typically for one ABS unit this requires twelve separate threading operations.

Likewise, each of the control valves must be similarly threaded. Furthermore, it is standard practice in the design and manufacture of the isolation control valves and hold/dump valves to provide for securing the internal valve seat or pole piece to the outer concentric valve body or sleeve by a threaded connection, thereby requiring two additional threading operations in the manufacture of a single control valve. The thread cutting operation in the design of the control valves also requires further steps in the manufacturing process to assure that metal shavings are eliminated as any such foreign matter may impeded the flow of brake fluid within the valve.

Figure 2:
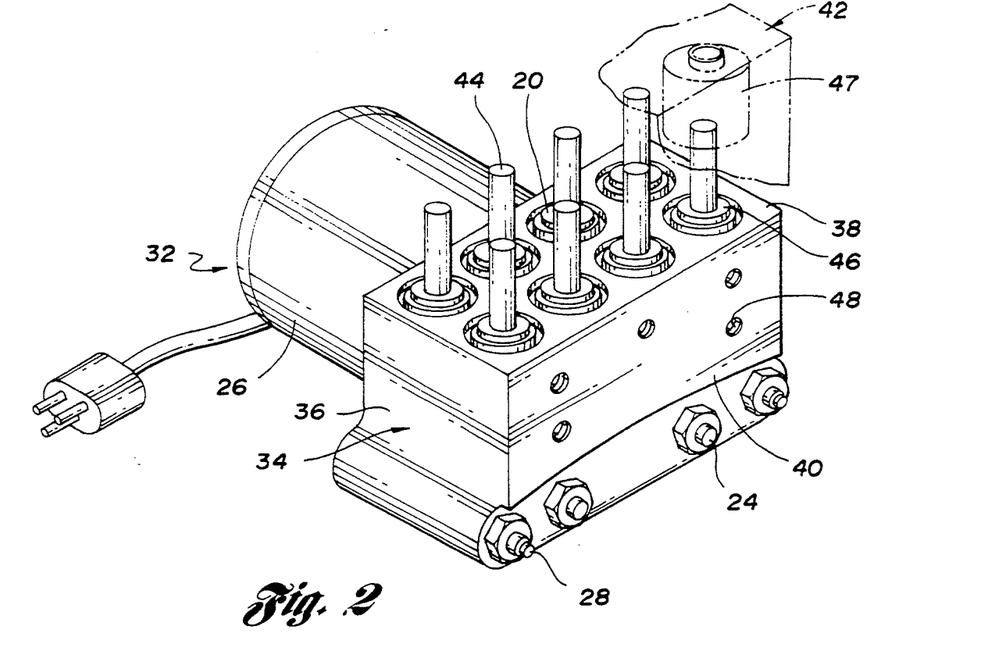
FIG. 2 is an overall exploded perspective view partially in cross-section showing an ABS hydraulic control unit and associated electronic control module as constructed in accordance with the present invention.

A typical control valve of the type described above as being part of the prior art is shown in FIG. 2 herein. The same general structure can be seen in U.S. Pat. No. 4,828,335, assigned to the assignee of the present invention, which is incorporated herein by reference as a teaching of the prior art ABS control valve devices and methods of making same.

SUMMARY OF THE INVENTION

The present invention contemplates a control valve for a vehicle anti-lock brake control unit designed such that it is not necessary to provide a threaded component for securing any part of the valve components to one another, nor in securing the control valve to the ABS control unit.

The invention further contemplates the control valve as above-described wherein the design itself, and the method of constructing the valve, substantially reduces or eliminates the generation of particles (e.g., machining shavings) and the trapping of particles within the control valve.

The invention further contemplates a control valve as above-described designed in such a manner that the control valve can be installed in the control unit occupying a minimum surface area on the wall of the control unit from which it extends, and thereby minimizing the overall size of the control unit.

The invention further contemplates a control valve as above-described constructed in such a manner that the installation of the control valve in the control unit can be accomplished in a minimum amount of time, and wherein the individual control valves can be secured in place within the housing by a common means securing two or more, including all, of the valves to the control unit.

Further, the invention contemplates a control valve for a vehicle anti-lock brake system control unit having a housing with a control valve bore therein. The control valve comprises a sleeve having a movable armature therein and a coil surrounding the sleeve for moving the armature. The coil has an inner diameter and an outer diameter. A valve body has a first and a second end. The second end is attached to the sleeve and the first end is seated within the control valve bore of the housing. The valve body also includes a coaxially extending throughbore. A cylindrical pole piece is received within the bore and has a first end and a second end, and a flow passage that extends coaxially of the pole piece from one end to the other end. The flow passage is restricted at the first end adjacent the armature and terminates in a valve seat. The pole piece further includes an axially extending second flow passage located in the outer circumference of the pole piece and extends from the first end to an outlet port located within the valve body. The armature is biased in a normally open position clearing the valve seat, whereby fluid communication is provided from the inlet port, through the pole piece, across the first end of the pole piece, through the second flow passage and thence to the outlet port, whereby open energizing the coil, the armature closes on the valve seat and interrupts any through flow. The pole piece is fixedly held within the valve body by means of the valve body first end being swaged over a portion of the pole piece to provide a swage joint.

The invention also contemplates a method of making the aforesaid control valve which comprises the steps of: (a) inserting said pole piece within said valve body until it is firmly seated within said throughbore, and (b) swaging at least a portion of said first end of said valve body radially inward into engagement with the first end of said pole piece.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
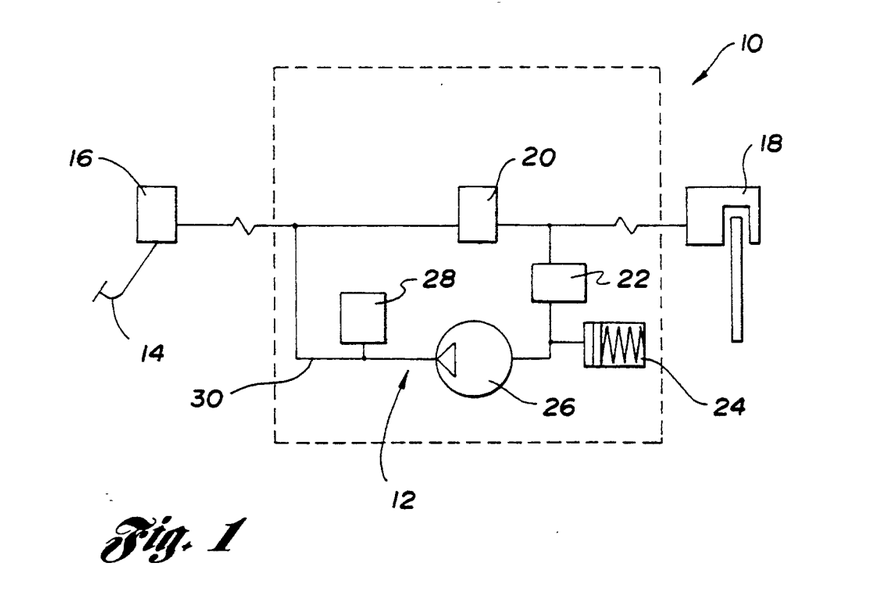
FIG. 1 is a schematic representation of a vehicular braking system including an anti-lock braking unit as part of the system, as known in the prior art and illustrated herein for purposes of background.

As seen in the schematic diagram of FIG. 1, it is common practice to include in a conventional braking system, generally designated 10, an anti-lock braking unit generally designated 12. The braking system 10, exclusive of the ABS unit 12, includes a brake pedal 14 acting on a master cylinder 16 to provide brake fluid under pressure to a slave cylinder 18 of a wheel brake assembly, e.g. a disc brake as shown. The ABS unit 12 includes an isolation valve 20, hold/dump valve 22, low pressure accumulator 24, pump 26, attenuator 28 and orifice 30. During normal braking (i.e. no wheel lockup), the operator applies foot pressure to the brake pedal 14 causing the master cylinder 16 to provide brake fluid under pressure through the isolator valve 20 to slave brake cylinder 18, thereby providing driver modulated or controlled braking of one of the vehicle wheels through this brake.

If a brake locking condition is sensed at the brake by a sensor (not shown), the solenoid actuated isolation valve 20 is closed to prevent further increase of brake pressure. The solenoid actuated hold/dump valve 22 is then opened as needed to reduce brake pressure by allowing flow into the low pressure accumulator 24. The pump 26 pumps fluid from the low pressure accumulator to the inlet side of the isolation valve 20. Upon lock-up ceasing, the hold/dump valve 22 is closed and the isolation valve 20 is opened as needed whereby high pressure fluid is again applied to the controlled brake 18.

Referring now to FIG. 2, an hydraulic control unit constructed in accordance with the present invention is shown, designated generally by reference numeral 32.

The control unit includes a valve body housing generally designated 34 having a plurality of walls 36, 38, and 40. It also includes an electrical control module (or CIM) generally designated 42 to be secured to the housing in final assembly.

Extending from one wall of the housing 34 is an electrically driven pump 26, for providing supplemental brake pressure to the wheels during controlled braking. Extending from another wall 38 is a plurality of solenoid actuated isolation valves 20 and hold/dump valves 22, generally one each for each wheel of the vehicle, and each aligned along a respective axis A,B for controlling the brake fluid pressure applied to each wheel brake. As shown in the drawing, only a solenoid sleeve 44 and a portion of the valve body 46 of each solenoid actuated isolation valve and hold/dump valve are visible. Each sleeve is in axial alignment with the remainder of the associated valve located within the housing.

Extending from yet another wall 40 of the housing 34 is a plurality of brake lines 48 for transmitting brake fluid in the hydraulic brake circuitry. Brake lines 48 lead to either the slave brake cylinders 18 of each wheel or the master brake cylinder 16. Extending from this same wall 40 are several low pressure accumulators 24 and attenuators 28, the function of each being well known in ABS systems and described briefly in connection with FIG. 1.

FIG. 2 also shows a plurality of casings 47, each surrounding a coil 49 (not shown), molded within the electrical control module 42. Control module 42 is a sub-assembly for placement over the respective sleeves 44 of the solenoid actuated isolation valves 20 and hold/dump valves 22 after the isolation and hold/dump valves 20, 22 have been installed in the housing 34 of the control unit.

Figure 3:
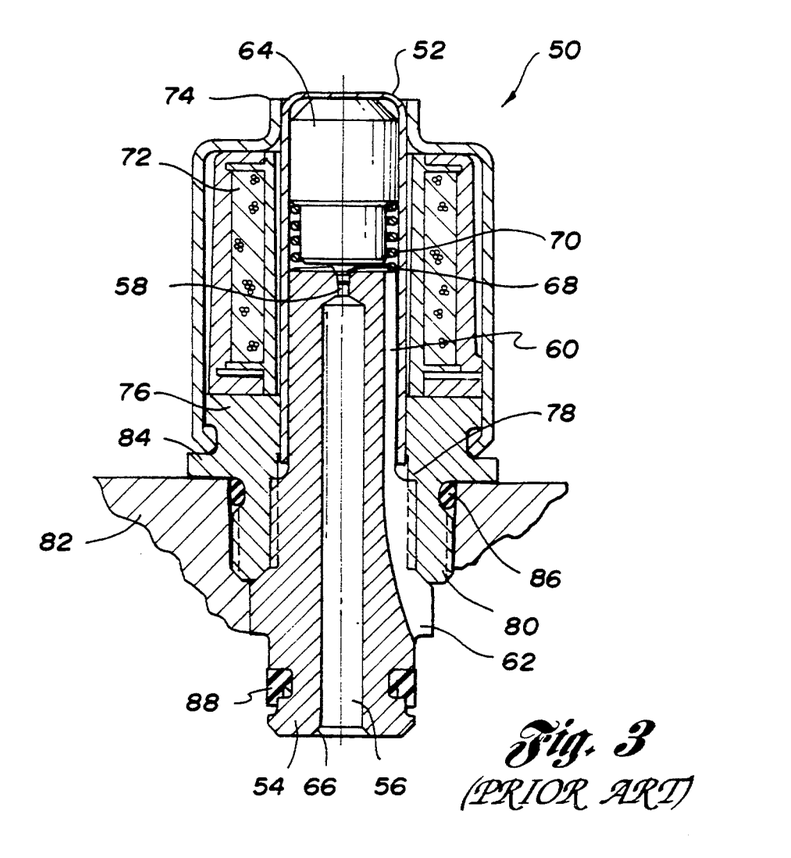
FIG. 3 is an elevation view in cross-section showing a conventional isolation valve as used in an ABS unit and known in the prior art.

FIG. 3 shows a threaded isolation valve as known to the prior art. It is briefly described herein for purposes of making a comparison between the prior art and the present invention. Further detail on the valve design may be had by reference to U.S. Pat. No. 4,828,335, assigned to the assignee of the present invention. The control valve 50 comprises a cylindrical sleeve 52 adapted to receive a concentric coaxially extending valve stem or pole piece 54. A flow passage 56 is provided extending axially through the center of the pole piece through an orifice 58, thence radially across the end of the pole piece, and from there along a slotted passage 60 open to the outer circumference of the pole piece and terminating at an outlet port 62. An armature 64 is located coaxially off the end of the pole piece and held in place by sleeve 52 which is brazed or otherwise fixed to the pole piece at its open end 66. The armature includes a ball valve 68 adapted to close the orifice when the solenoid is energized. Thus, the armature is biased in a normally open position by a coil-type compression spring 70 which holds the armature against the closed end of the sleeve. An electromagnetic coil 72 surrounds the armature and sleeve 52 and is maintained secured to the valve body by means of a cup-shaped cap or casing 74 which is crimped inwardly at its open end 66 within an annular groove formed at the outer circumference of the valve body 76, thus securing the electromagnetic coil and valve body as a unit.

It will be noted that the pole piece is threadedly connected to the valve body as shown at 78. Likewise, the outer diameter of the valve body at one end is similarly threaded at 80, thereby allowing the control valve to be threadedly connected to the housing 82. The valve body includes an annular flange 84 having a hexagonal shape such that an ordinary socket wrench can be used to drive the valve body into the housing with sufficient resistive torque along the thread 80 to maintain the control valve secure within the housing.

It will be noted in FIG. 3 that the annual hexagonally-shaped flange 84 projects radially beyond the outer diametric extent of the coil casing 74. A large flange is necessary for purposes of fitting the socket wrench onto the valve. However, the radial extend of the flange increases the spacing required between centers of adjacent control valves and this contributes to the overall enlarged size of the ABS control unit.

An 0-ring 86 provides a fluid seal between the valve body and housing 34. Likewise, a similar 0-ring or lip-type seal 88 is provided at the inner end of the pole piece to assure that the high pressure brake fluid coming from the brake pedal is maintained and sealed from flowing anywhere other than through flow passage 56.

As previously described, during normal braking operation, the fluid will flow through the inlet line through the center of the valve, past normally open orifice 58 and out along the outside of the pole piece through slotted passage 60, outlet port 62, and to the brakes 18. When the solenoid coil 72 is energized, the armature ball valve 68 will close upon the orifice 58, thereby shutting off the flow of the brake fluid from the brake pedal, and allowing the ABS circuit 12 to bring the wheel to an unbraked condition.

As might be imagined, the cutting of the threads 78, 80 in the pole piece and valve body involves a number of different machining operations including boring and threading which are expensive manufacturing operations and which add overall cost to the valve component. Further, the machining of the threads makes possible the creation of contaminant metal particles which may become trapped within the control valve during assembly of our subsequent operation. Likewise, just the existence of the threads themselves creates the possibility of trapping minute particles that would otherwise flow through the system.

In all of the embodiments of the present invention as shown in FIGS. 4-8, the control valve is constructed as a threadless valve. No threads are required to secure the pole piece to the valve body. Likewise, no threads are required to secure the valve within the ABS control unit. The embodiments differ from one another principally (i) in the specific manner in which each is secured within the control unit housing, and (ii) the manner in which the electromagnetic coil is integrated into the control valve design, i.e. in certain embodiments the electromagnetic coil is part of a integrated electronic control module, also known by the designation CIM (for Coil Integrated Module) and in other embodiments the electromagnetic coil is secured to the valve body in the manner as shown in connection with FIG. 3 as known to the prior art.

Figure 4:
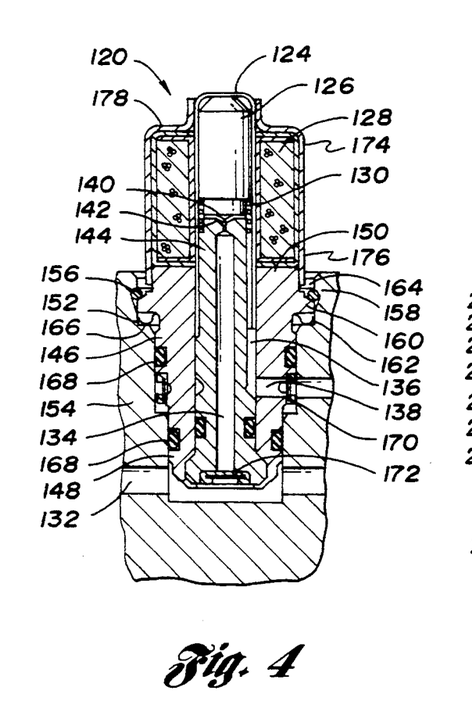
FIG. 4 is an elevation view in full cross-section showing a hydraulic unit and associated control valve as constructed in accordance with a first embodiment of the present invention.

Referring now to FIG. 4, a first embodiment of a control valve of the present invention is shown. The control valve depicted in FIG. 4 is a solenoid actuated isolation valve 120. It should be noted, however, that the various embodiments of the present invention as described below are equally applicable to the solenoid actuated hold/dump valves 22 discussed above.

In this embodiment, the normally open isolation valve 120 comprises a cylindrical sleeve 124 having a movable armature 126 slidably received therein. The control valve 120 further comprises an annular coil 128 surrounding the sleeve 124. When coil 128 is energized, armature 126 is drawn against a biasing spring 130, closing off fluid flow through passages 132, 134, 136, 138 by seating the integral armature ball valve 140 onto the valve seat 142 of valve stem 144 at the end of flow passage 134.

The isolation valve 120 further comprises a valve body 146 having an inner end 148 and outer end 150. The outer end 150 of the valve body 146 is attached to the sleeve 124, while the inner end 148 of the valve body 146 is seated within a bore 152 formed in the valve body housing 154. The outer end 150 of the valve body 146 is preferably attached to the sleeve 124 by a brazing process, but other conventional forms of attachment may also be used.

The isolation valve 120 of this embodiment further comprises a snap ring 156 for securing the inner end 148 of the valve body 146 within the bore 152 of the housing 154. Snap ring 156 is preferably an annular ring having a circular cross-section. As seen in FIG. 4, the valve body 146 and the bore 152 each include a retaining flange 158, 160 in the form of a shoulder formed therein. The respective retaining flanges 158, 160 of the valve body 146 and the bore 152 are reciprocal and cooperate to receive the snap ring 156. A wave washer 162 seated within counterbore 164 on shoulder 166 serves to bias the retaining flange 158 against the snap ring.

Flow is restricted to flow passages 132, 134, 136, 138 by 0-ring seals 168. Annular filter 170 and disc-type filter 172 assist in precluding the possibility of particulates appearing in flow passages 134 and 136.

The isolation valve 120 further comprises a casing 174 having an open end 176 and a substantially closed end 178. The open end 176 of the casing 174 is adapted to receive the coil 128 and is attached to the outer end 150 of the valve body 146. As shown in FIG. 2, such attachment is preferably a slip fit. This arrangement, as with the embodiment of FIG. 3, allows that the casing 174 may be integrated with the coil integrated module (CIM) or electric control module 42 (FIG. 1), i.e. molded in place as a single unit. Thereafter, as a final assembly step the CIM 42 is fitted onto control unit housing 34 with each of the respective casing/coil units being slidably received over the respective sleeves 124 and with the casing 174 making sliding contact at its open end with the respective control valve body 146.

Another construction, this one being known to the art, is to provide the outer end 150 of the valve body 146 with an annular groove (not shown) into which the open end 176 of the casing 174 may be crimped, as shown in FIG. 3. With either arrangement, the casing 174 serves to secure the coil 128 about the sleeve 124. To enhance the magnetic field set up by the electrically energized coil 128, the casing 174 and valve body 146 are preferably constructed from a ferrous material, such as steel.

Figure 5:
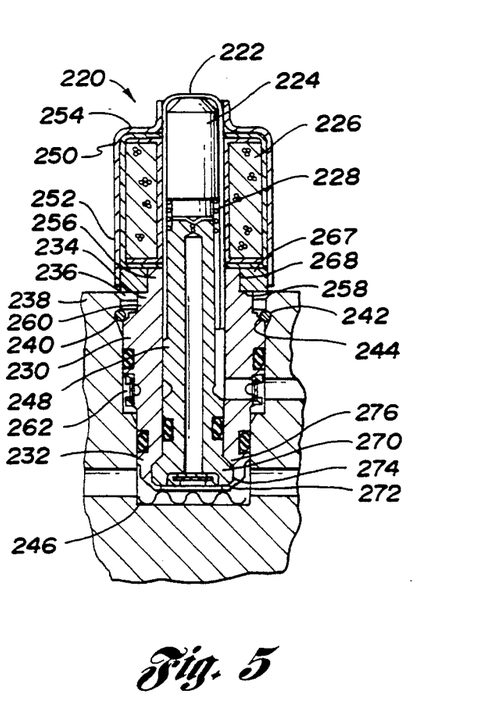
FIG. 5 is an elevation view in full cross-section similar to FIG. 3 and showing a second embodiment of the present invention.

Referring now to FIG. 5, a second embodiment of a control valve of the present invention is shown. In this embodiment, the isolation valve 220 once again comprises a sleeve 222 having a movable armature 224 therein, an electrically energizable coil 226 surrounding the sleeve 222 for moving the armature 224 against a biasing spring 228, and a valve body 230 having an inner end 232 and outer end 234.

The inner end 232 of the valve body 230 is again seated within a control valve bore 236 formed in the valve body housing 238, while the outer end 234 is again attached to the sleeve 222. However, the valve body 230 of this embodiment has a smaller outer diameter relative to that of the valve body 230 of the embodiment shown in FIG. 4. More specifically, the valve body 230 of this embodiment has an outer diameter less than or equal to the outer diameter of the coil 226.

The isolation valve 220 of this embodiment once again includes a snap ring 240 for securing the inner end 232 of the valve body 230 within the bore 236 of the housing 238. However, since the outer diameter of the valve body 230 has been reduced in this embodiment, the diameters of the bore 236 and snap ring 240 are likewise reduced. Moreover, the valve body 230 and the bore 236 again each include a retaining flange 242, 244 in the form of a shoulder formed therein. The respective retaining flanges 242, 244 of the valve body 230 and the bore 236 are reciprocal and cooperate to receive the snap ring 240. A wave washer 246 seated at the bottom of the main bore of the housing and bearing against the head of the valve stem 248 serves to bias the valve against the snap ring 240.

Still referring to FIG. 5, isolation valve 20 further comprises a casing 250 having an open end 252 and a substantially closed end 254. In this embodiment, however, the outer diameter of the outer end 234 of the valve body 230 is reduced relative to the outer diameter of the remainder of the valve body 230. This reduced diameter portion is shown as annular land 256. The land 256 terminates at a radial shoulder 258 which terminates at a second annular land 260, the diameter of which is less than the maximum diameter portion 262 of the inner end 232 of the valve body 230. Thus, in this embodiment, the retaining flange 242 is formed at the junction of the reduced diameter portion constituting second annular land 260 with the outer extremities 262 of the inner end of the valve body. This is in contrast to the embodiment of FIG. 4 wherein the retaining flange 160 radially extends beyond the maximum diameter of the valve body inner end 148 and thus requires a substantially enlarged counterbore 164 to secure the valve to the control unit.

A separate flux ring 267 is provided having an inner diameter sized to be slidably received onto the reduced diameter portion 268 of the outer end 234 of the valve body 230. The flux ring rests on shoulder 258. It is separately installed onto the valve body once the valve body is secured in place via snap-ring 240 within the housing 238. Preferably, the casing 250, coil 226 and the flux ring 267 will be constructed as a single unit and integrated with the CIM, as with the embodiment of FIG. 4. For example, the flux ring 267 may be held to the casing by crimping as described earlier. In such a fashion, the coil 226 is held within the casing 250 between the substantially closed end 248 of the casing 250 and the flux ring 267, and as in the previous embodiment, the casing 250 (and coil 226 and flux ring 267) may be slip-fitted onto the sleeve 222.

Alternatively, the flux ring 267 can remain a separate part to be slip-fitted (or secured) onto the control valve 230 following securement of the control valve into the housing 238, with the casing/coil unit thereafter being slip-fitted onto the sleeve 222 and flux ring.

Once again, to enhance the magnetic field set up by the electrically energized coil 226, the flux ring 267, casing 250 and valve body 230 are preferably constructed from a ferrous material, such as steel.

As previously described, the flux ring 267, coil 226, and casing 250 preferably form a sub-assembly with the electrical control module 42 (see FIG. 2) for placement over the sleeve 222 of the isolation valve 220. The construction of such a sub-assembly is facilitated by the use of the flux ring 267 which, as also previously described, serves to hold the coil 226 within the casing 250. Additional design details of the control valve and its operation may be found in U.S. Pat. No. 4,828,335, assigned to the assignee of the present invention, which is incorporated herein by reference for such further description.

It will be noted in connection with the embodiment shown in FIGS. 4 and 5, the valve stem is secured to the valve body by swaging. In FIG. 5, for example, valve stem 248 includes a radially enlarged head 270 at its one end, with the head including an annular tapered end wall 272 at the radially outermost portion of the head. Adjacent the tapered end wall 272 is a cylindrical land 274 contiguous with the similarly tapered back wall 276 which adjoins the remainder of the pole piece. Both the tapered end wall 272 and tapered back wall 276 diverge outwardly from the valve axis at approximately the same angle, preferably 45°, thereby forming an included angle of approximately 92°. The radial extent and length of the flange or head 270 is predetermined so as to be sufficient to withstand the swaging operation, described below, and securing the pole piece to the valve body 230.

The valve body is counterbored at its one end to accept as a slip-fit the head of the pole piece. Thus, it is counterbored to provide a tapered shoulder matching the back wall 276.

Figure 9:
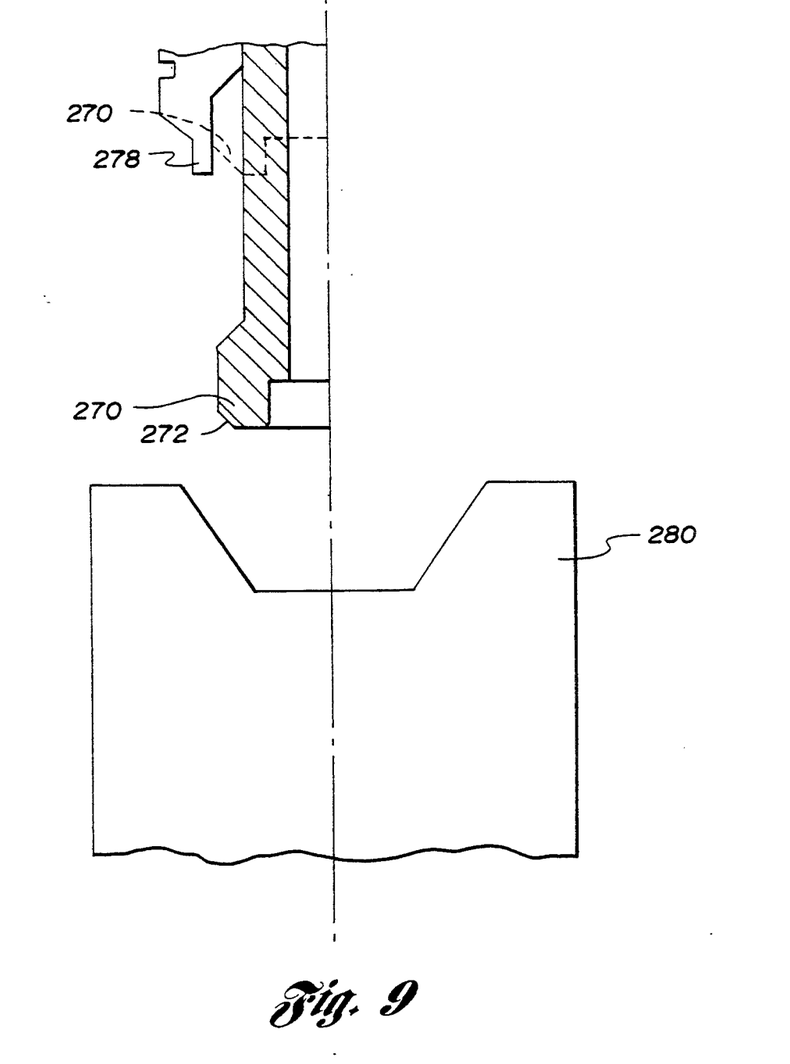
FIG. 9 is a schematic view showing the method by which the valve pole piece is secured to the valve body by swaging.

As a final step in securing the pole piece to the valve body, the terminal end portion 278 of the valve body, as shown in FIG. 9, is cone swaged over the end of the head 270 causing the terminal end to flow radially inwardly along by forcing swaging tool 280 down onto the end portion 278 and the tapered end wall 272 of the valve body, thereby securing the valve stem relative to the valve body.

Prior to the swaging operation, all of the flow passages, 0-ring grooves, and related features of the valve body and pole piece will have been machined or otherwise finished to final dimension.

Figure 6:
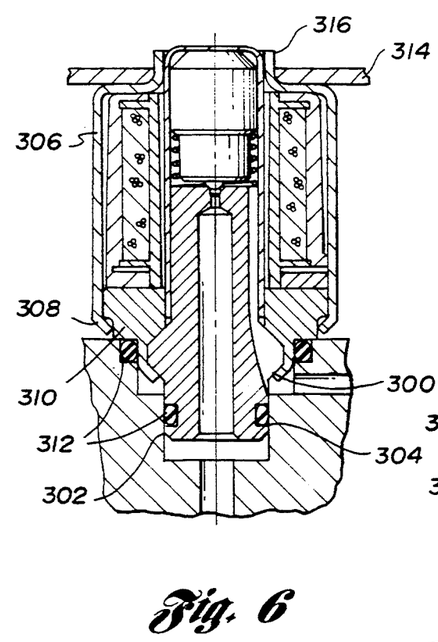
FIG. 6 is an elevation view in full cross-section similar to FIG. 3 and showing a third embodiment of the present invention.

FIG. 6 shows a third embodiment constructed in the same manner as the previous embodiments of FIGS. 4 and 5 other than the design details mentioned below. In this design, it will be noted that the tapered flange or head of the valve body is located a predetermined axial distance from the end of the pole piece. It includes the same tapered end wall 300, cylindrical land 302 and tapered back wall 304 as with the previous embodiments. Likewise, the valve body is counterbored in the same manner as previously described and the terminal ends are swaged over the tapered end wall 300 to secure the valve body to the pole piece.

The coil casing 306 is seen to be fixed to the valve body as by crimping the open end of the casing, as shown at 308, about a radial flange 310, similar to the manner as described in connection with FIG. 3. 0-rings 312 seal the control valve relative to the housing in the same manner as described in the previous embodiments with respect to 0-rings 168, respectively. The control valve is held secured to the housing by means of a top plate 314 having a series of holes sized to slip over the collar 316 of casing 306 of each valve unit, and thereby providing a single plate which will hold all control valves secured to the valve housing by suitable clamping means (not shown), such as for example, bolts extending from the plate into the housing.

Figure 7:
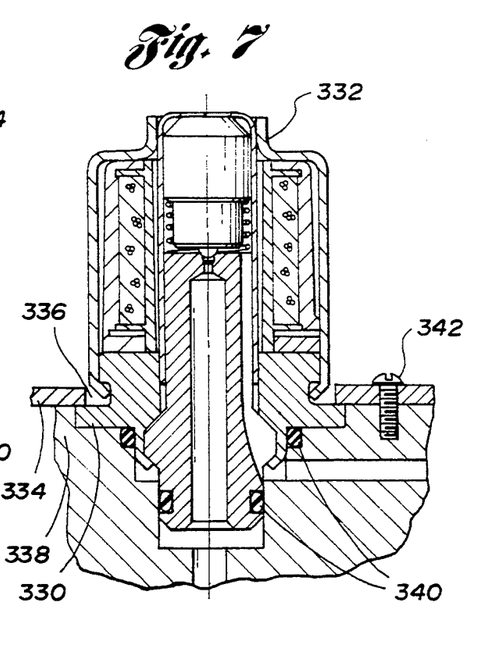
FIG. 7 is an elevation view in full cross-section similar to FIG. 3 and showing a fourth embodiment of the present invention.

FIG. 7 shows a fourth embodiment of the present invention constructed in the same manner as previously described with regard to FIG. 6, other than the details described below. Specifically, it will be noted that the valve body includes an additional radial flange 330, similar to that shown in FIG. 3, in that it radially extends beyond the diametric extent of the casing 332. Unlike FIG. 3, the flange 330 is cylindrical, and the control valve is held to the housing by means of a hold down plate 334. The plate 334 is similar to that described in connection with FIG. 6 in that it includes a series of centered holes 336 which allow that one plate may secure all valve units to the control unit. However, the holes are large enough to receive the entire casing 332 and to hold the control valve down at the flange 330 such that the hold down plate can be brought to rest against the wall of the housing 338. Any tolerances in this clamping operation are taken by the 0-ring 340. The hold down plate is secured in place by a series of bolts 342 threaded within the housing.

Figure 8:
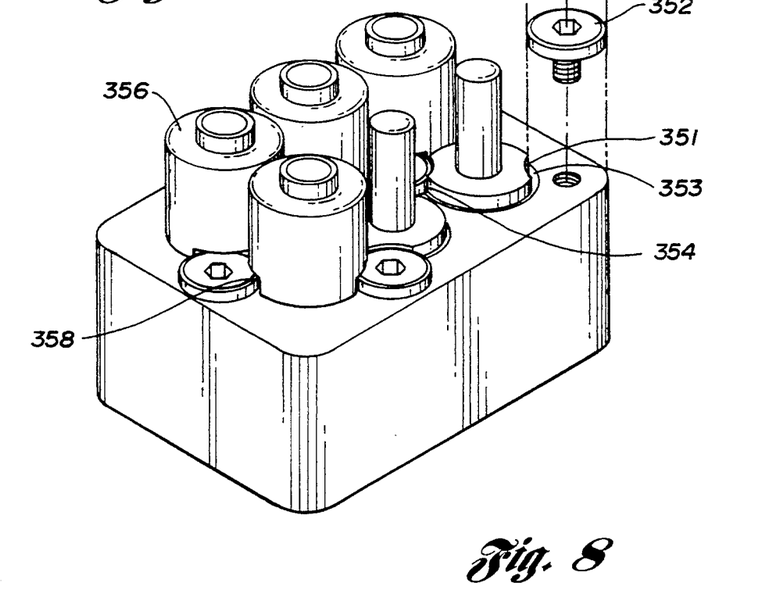
FIG. 8 is an elevation view in full cross-section showing a fifth embodiment of the present invention.

In FIG. 8, there is shown a fifth embodiment, similar to that shown with respect to FIG. 7, with the exception that the annular flange 350 includes pair of half moon-shaped cut-out portions 351 having a depth of approximately ½ the thickness of the flange 350 and adapted to receive at each half moon cut-out section or pocket a portion of a bugle head-type screw 352, which will bear against the cut-out flat seat 353 of flange 350. The two hold down pockets 351 of each valve are diametrically opposed to one another so that any two adjacent control valves can be held secured to the housing by a common screw fastener. Obviously, depending on the specific nesting of the control valves, not all of the fasteners can be spaced to hold down two or more control valves. At certain points, in order to achieve holding down the control valve at two points diametrically opposed from one another, a single hold down fastener will be required for a particular control valve. Each coil casing 356 includes a cutout portion 358 which allows the casing to overlap the head of the screw 352.

While the best mode for carrying out the invention has been described in detail, those familiar with the art to which this invention relates will recognize various alternative designs and embodiments for practicing the invention as defined by the following claims.

What is claimed is:

1. A control valve for a vehicle anti-lock brake system control unit having a housing with a control valve bore therein, the control valve comprising:
    a sleeve having a moveable armature therein;
    a coil surrounding the sleeve for moving the armature, the coil having an inner diameter and an outer diameter; and
    a valve body having a first and a second end, the second end attached to the sleeve and the first end seated within the control valve bore of the housing,
    said valve body including a coaxially extending throughbore,
    a cylindrical pole piece received within said bore and having a first end and a second end, and a flow passage extending coaxially of said pole piece from one said end to the other,
    said flow passage being restricted at said first end adjacent said armature and terminating in a valve seat,
    said pole piece further including an axially extending second flow passage located in the outer circumference of said pole piece and extending from said first end to an outlet port located within said valve body,
    said armature being biased in a normally open position clearing said valve seat whereby fluid communication is provided from said inlet port, through said pole piece, across the first end of said pole piece, through said second flow passage and thence to said outlet port, and whereby open energizing said coil, the armature closes on said valve seat and interrupts any through flow,
    said pole piece being fixedly held within said valve body by means of said valve body first end being swaged over a portion of said pole piece to provide a swage joint.

2. The control valve of claim 1 wherein said pole piece includes an annular flange at least proximate said pole piece first end, and said swage joint enfolds said annular flange.

3. The control valve of claim 1 wherein said annular flange includes a cylindrical land, a tapered front wall facing the first end of said pole piece and a tapered back wall facing the second end of said pole piece, and wherein the swage joint is limited to the first end of said valve body being swaged upon said tapered front wall of the pole piece annular flange.

4. A method of making a control valve for a vehicle anti-lock brake system control unit having a housing with a control valve bore therein, the control valve comprising:
    a sleeve having a moveable armature therein;
    a coil surrounding the sleeve for moving the armature, the coil having an inner diameter and an outer diameter; and
    a valve body having a first and a second end, the second end attached to the sleeve and the first end seated within the control valve bore of the housing,
    said valve body including a coaxially extending throughbore,
    a cylindrical pole piece received within said bore and having a first end and a second end, and a flow passage extending coaxially of said pole piece from one said end to the other, said method comprising the steps of:
    (a) inserting said pole piece within said valve body until it is firmly seated within said throughbore, and
    (b) swaging at least a portion of said first end of said valve body radially inward into engagement with the first end of said pole piece.

5. The method of claim 4 wherein said swaging is done at near ambient temperature.

6. The method of claim 5 wherein said pole piece includes an annular flange at least proximate said pole piece first end, and said swage joint enfolds said annular flange.

7. The method of claim 6 wherein said annular flange includes a cylindrical band, a tapered front wall facing the first end of said pole piece and a tapered back wall facing the second end of said pole piece, and wherein the swage joint is limited to the first end of said valve body being swaged upon said tapered front wall of the pole piece annular flange.

8. In combination, a control valve for a vehicle anti-lock brake system control unit and a housing having a control valve bore therein comprising:
    a sleeve having a moveable armature therein;

a coil surrounding the sleeve for moving the armature, the coil having an inner diameter and an outer diameter; and a valve body having a first and a second end, the second end attached to the sleeve and the first end seated within the control valve bore of the housing, said valve body including a coaxially extending throughbore, a cylindrical pole piece received within said bore and having a first end and a second end, and a flow passage extending coaxially of said pole piece from one said end to the other, said flow passage being restricted at said first end adjacent said armature and terminating in a valve seat, said pole piece further including an axially extending second flow passage located in the outer circumference of said pole piece and extending from said first end to an outlet port located within said valve body, said armature being biased in a normally open position clearing said valve seat whereby fluid communication is provided from said inlet port, through said pole piece, across the first end of said pole piece, through said second flow passage and thence to said outlet port, and whereby open energizing said coil, the armature closes on said valve seat and interrupts any through flow, said pole piece being fixedly held within said valve body by means of said valve body first end being swaged over a portion of said pole piece to provide a swage joint, and means for holding said control valve within and affixed to said housing.

9. The combination of claim 8 wherein said holding means includes a flat plate fitted over said control valve and bearing against a portion of said control valve, and a fastener securing said flat plate to said housing.

10. The combination of claim 8 wherein said securement means includes a pair of fasteners threadedly connected to said housing, each having an enlarged radially extending head overlapping a portion of said control valve at diametrically opposed positions on said control valve.

11. The combination of claim 8 wherein said securement means includes a snap ring for securing the inner end of the valve body within the control valve bore of the housing.

12. The combination of claim 11 wherein the valve body and the control valve bore of the housing each include a retaining flange, the respective retaining flanges cooperating to receive the snap ring.

13. The combination of claim 12 further comprising a casing for securing the coil about the sleeve, the casing being attached to the valve body.

* * * * *